United States Patent [19]

Cho

[11] Patent Number: 5,113,086
[45] Date of Patent: May 12, 1992

[54] POLAROTATOR PULSE GENERATOR CIRCUIT FOR A RECEIVER OF SATELLITE BROADCASTING

[75] Inventor: Seong-Jae Cho, Anyang, Rep. of Korea

[73] Assignee: SamSung Electronics Co., Ltd., Suwon, Rep. of Korea

[21] Appl. No.: 524,916

[22] Filed: May 18, 1990

[30] Foreign Application Priority Data

Dec. 20, 1989 [KR] Rep. of Korea ............. 89-19361

[51] Int. Cl.$^5$ .......... H03K 4/00; H03K 5/13; H03K 5/59; H03K 21/00
[52] U.S. Cl. .................. 307/260; 307/261; 307/265; 307/269; 328/28; 328/55; 328/63; 377/43
[58] Field of Search ........... 307/261, 269, 480, 265; 328/28, 63, 72, 58, 55; 377/43

[56] References Cited

U.S. PATENT DOCUMENTS 4,006,454 2/1977 Beseke et al. .............. 328/28
4,613,973 9/1986 Dahl ....................... 328/28

Primary Examiner—Stanley D. Miller
Assistant Examiner—Trong Phan
Attorney, Agent, or Firm—Robert E. Bushnell

[57] ABSTRACT

A polarotator pulse generator circuit is disclosed in which a sine-to-square converter converts a sine wave of AC power supply to a square wave, a clock synchronizer synchronizes the square ware of the sine-to-square converter with a high frequency clock and provides a loading instance control signal, a latch provides after synchronizing the data corresponding to the pulse width for the control of the polarotator with a clock being applied, a counter counts the clock with a start value determined by the data provided from the latch in accordance with an applied clock and loaded in accordance with the loading instance control signal, and a counter disable part stops the count until the next loading signal enters when a carry over occurs.

14 Claims, 4 Drawing Sheets

POLAROTATOR PULSE GENERATOR CIRCUIT FOR A RECEIVER OF SATELLITE BROADCASTING

BACKGROUND OF THE INVENTION

The present invention relates to a receiver for satellite broadcasting, more particularly to a polarotator pulse generator circuit which controls a polarotator for changing an angle of a receiving antenna probe for satellite broadcasting. In order to receive a multichannel electric wave transmitted from a satellite in a satellite broadcasting receiver, the angle of the probe attached to an antenna of the receiver according to a deflection of the electric wave needs to be changed by using a polarotator.

Generally, for driving the polarotator in a satellite broadcasting receiver, there is needed a pulse as shown in FIG. 5 (a), which has a period T of 16-21 msec and a width W of minimum 0.7 msec and maximum 2.3 msec.

When the pulse as shown in FIG. 5 (a) is applied, the polarotator controls an angle of the probe attached to an antenna of a satellite broadcasting receiver from 0 to 180 degrees according to a change of the pulse width. For example, supposing that a minimum pulse width W 0.7 msec corresponds to 0 degree, a maximum pulse width W 2.3 msec corresponds to 180 degrees for which the pulse period T must be in the range of 16 to 21 milliseconds.

That is, in order to control a probe of the antenna according to the deflection of the received electric wave in the satellite broadcasting receiver, a PWM (pulse width modulation) signal is needed and the power supply and ground level must be also transmitted to the polarotator.

The conventional polarotator pulse generator circuit is composed as shown in FIG. 1 to generate the PWM signal.

In FIG. 1, a control voltage input part 1 for converting an applied square wave signal to a linear control voltage comprises resistors R3, R4, R5 and capacitors C2 and C3 which charge and discharge an applied voltage according to a RC time-constant.

A charging/discharging part 2 controls a timer IC by receiving a DC voltage, in which the DC voltage is connected to a charging resistor R1, and a discharging resistor R2 and a diode D1 are connected to the charging resistor R1 and to the capacitor C1. At this time, the resistor R1 is valued much lower than that of R2.

Said timer IC connected to the control voltage input part 1 and the charging-and-discharging part 2 to provide the control square output to the polarotator is composed as shown in FIG. 2.

In a comparing part 3, an output of the diode is applied to a noninverting terminal + of a comparator CP1, while the output of the control voltage input part 1 is applied to an inverting terminal − of a comparator CP1. Also, a power supply voltage VCC is connected to the inverting terminal − of the comparator CP1 through a voltage dividing resistor RA1 among resistors RA1, RA2 and RA3 having the same resistance value.

When there is no voltage applied from the control voltage input part 1 to the inverting terminal − of the comparator CP1, if the output of the charging and discharging part 2 is more than ⅔ VCC, the comparator CP1 provides a high level output.

On the other hand, the discharge voltage of the capacitor C1 in the charging and discharging part 2 is applied to an inverting terminal − of a comparator CP2, while the power supply voltage VCC is applied to a noninverting terminal + of a comparator CP2 through the voltage dividing resistors RA1 and RA2, so that when there is no voltage applied from the control voltage input part 1, if the discharge voltage of the capacitor C1 is below ⅓ VCC, the comparator CP2 provides a high level output.

An output part 4 for providing a square wave control signal to a polarotator according to the outputs of the comparing part 3, comprises a RS flip-flop, a switching transistor Q1, and an inverter I1. The outputs of the comparators CP1 and CP2 are applied to the reset and set terminals R and S of the RS flip-flop respectively. The output of the RS flip-flop is applied to the switching transistor Q1, thereby controlling the charge and discharge of the capacitor C1 according to the driving of the transistor Q1. Also, the output of the RS flip-flop is inverted by the invertor I1 and the inverted output is provided to control the polarotator.

In this conventional polarotator generator circuit, if the output of the pin 3 of the timer IC is high, since the output Q of the RS flip-flop provides a high level signal, the transistor Q1 is turned off. In this case, a DC voltage is charged to the capacitor C1 through the resistor R1 and the diode D1, for which if the charged voltage of the capacitor C1 is larger than ⅔ VCC, the comparator CP1 becomes high level signal and is applied to the reset terminal R of the RS flip-flop. At this time the RS flip-flop is reset and the output terminal Q of the RS flip-flop provides a low level signal, so that the transistor Q1 is turned on and pin 3 provides a low level signal.

With the transistor Q1 turn-on, the voltage charged in capacitor C1 is discharged through the resistor R2 and if the voltage of capacitor C1 becomes below ⅓ VCC, the comparator CP2 applies a high level signal to the set terminal S of the RS flip-flop. Thus, the RS flip-flop is set and the output Q of the RS flip-flop provides a high level signal, thereby turning off the transistor Q1. With the transistor Q1 turn-off, the pin 3 provides a high level signal, so that the above operation is repeated from the start.

That is, the pulse width W, a logic high state in FIG. 5 (a), is determined by a time spent for the voltage across the capacitor C1 to increase from ⅓ VCC to ⅔ VCC through the diode D1 and the charging resistor R1. The difference of the pulse period and the pulse width, T-W in FIG. 5 (a), is determined by a time spent for the voltage across the capacitor C1 to fall from ⅔ VCC down to ⅓ VCC through the discharging resistor R2.

Since the polarotator pulse has the smaller pulse width W than the pulse period T, when the capacitor C1 charges, the diode D1 is used in parallel with the resistor R2 to avoid the resistor R2. At this time, the resistance value of R1 is much smaller than that of R2 so that the charge time can be reduced, Thus, there is always provided the pulse from to the pin 3 of the Timer IC.

If a control voltage is used to change the reaching voltage of the capacitor more or less than ⅔ VCC, the time of pulse width W for the capacitor C1 to increase from ⅓ VCC to the controlled reaching voltage is adjusted, thereby obtaining a desired pulse width.

However, the control voltage must be DC voltage, so that the MICOM (microcomputer) must employ a digital-to-analog converter for changing the level of DC voltage in MICOM, making the circuit more complex.

Thus, without the use of the digital-to-analog converter, the pulse width is changed by using a pulse width modulating port of the MICOM and the pulse width modulated output signal is converted to the DC control voltage by using the capacitors C2 and C3. But, although the pulse width modulated output signal changes linearly, the extracted DC voltage does not change linearly.

Also, the pulse width W of the polarotator signal does not change linearly, so that the polarotator rotates fast the probe of the antenna at first, but the polarotator rotates slowly toward the end of rotation. It results that the rotation speed of the probe is not constant.

SUMMARY OF THE INVENTION

The present invention is to provide a polarotator pulse generation circuit for a satellite broadcasting receiver, which controls linearly the pulse width by counting a high frequency clock and rotates the probe of the antenna with a constant speed from the beginning to the last.

According to the present invention, there is provided a polarotator pulse generator circuit comprising a sine-to-square converter for converting a sine wave of an AC power supply to a square wave, a clock synchronizer for synchronizing the square wave of the sine-to-square converter with a high frequency clock and providing a loading instance control signal, a latch for providing the synchronized data corresponding to the pulse width of the polarotator pulse for the control of the polarotator TP clock being applied, a counter for counting the clock with a start value determined by the data provided from the latch in accordance with an applied clock and loaded in accordance with the loading instance control signal, and a counter disable part for stopping the count, until the next loading signal enters, when a carry occurs in said counter.

BRIEF DESCRIPTION OF THE DRAWINGS

These and other objects, features, and advantages of the present invention will become more apparent from the following description for the preferred embodiments taken in conjunction with the accompanying drawings, in which.

DETAILED DESCRIPTION OF THE INVENTION

The present invention is described in more detail with reference to the accompanying drawings.

Figure 1:
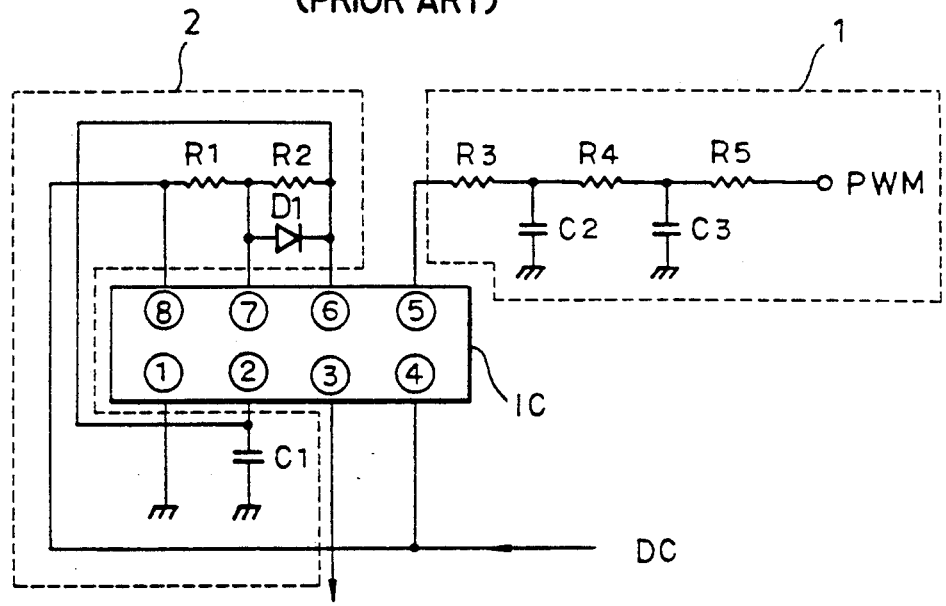
FIG. 1 is a circuit diagram of a conventional polarotator generator circuit.
Figure 2:
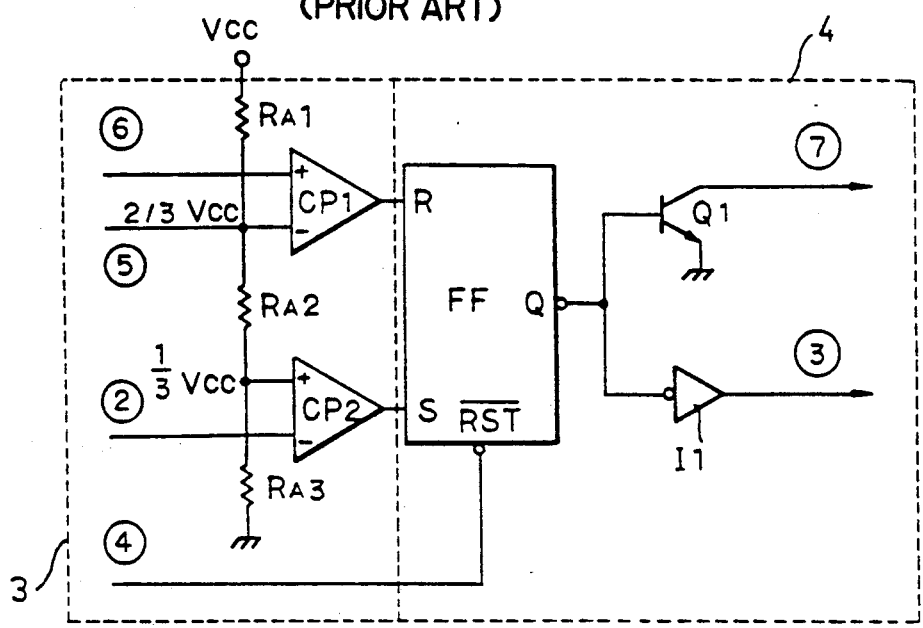
FIG. 2 is an internal diagram of a timer IC included in the conventional polarotator pulse generator circuit of FIG. 1.
Figure 3:
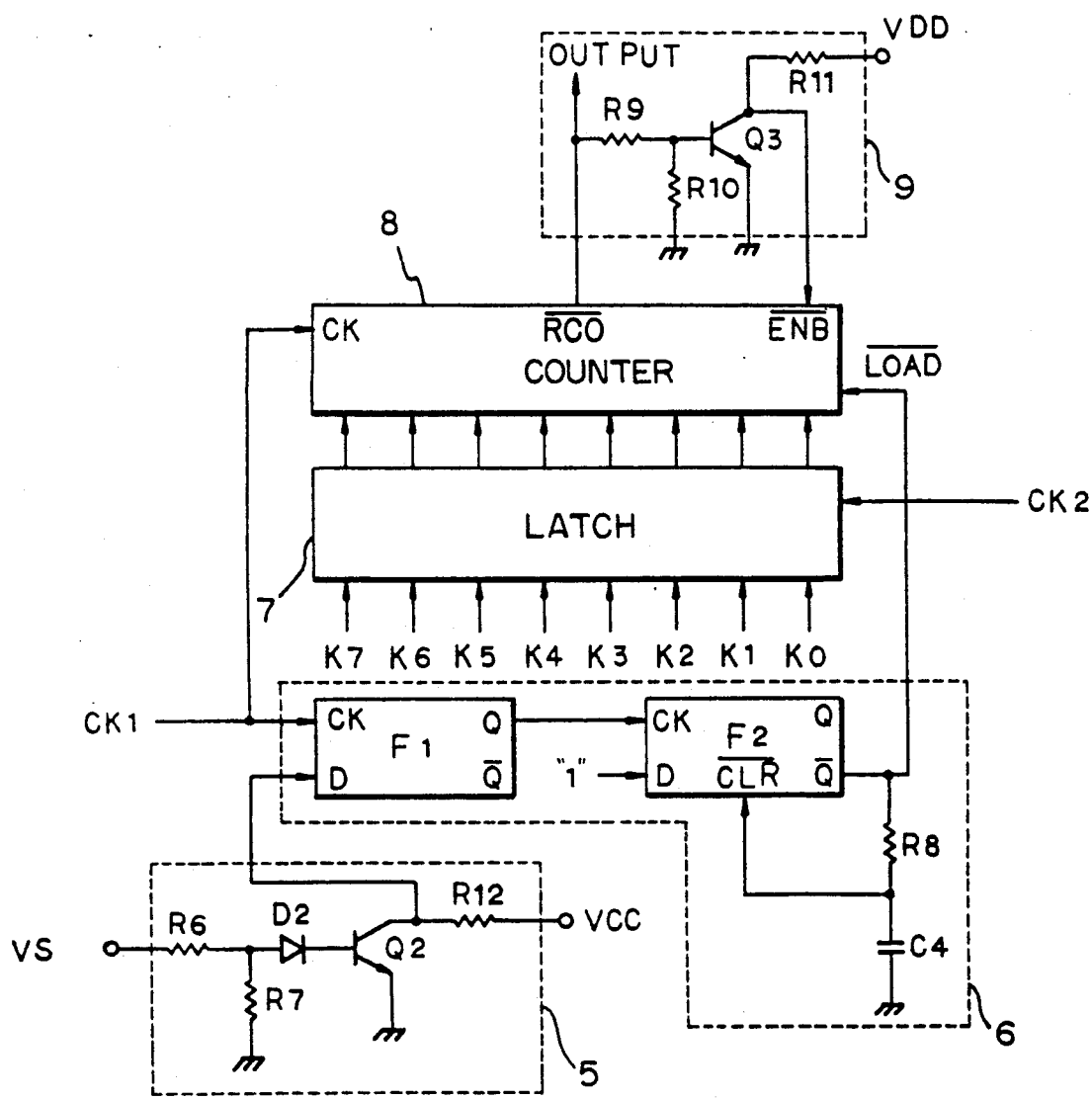
FIG. 3 is a schematic diagram of a polarotator pulse generator circuit of a satellite broadcasting receiver according to the present invention.

FIG. 3 shows a polarotator pulse generator circuit of the satellite broadcasting receiver according to the present invention.

In FIG. 3, a sine-to-square converter 5 for converting the sine wave of a power supply VS to a square wave, comprises biasing resistors R6 and R7, a protection diode D2, and a transistor Q2.

A clock synchronizer 6 for adjusting a loading time by synchronizing the output of the sine-to-square wave converter 5 with a high frequency clock CK1, comprises two D-type flip-flops F1 and F2, where the square output signal is applied to a terminal D of F1 and the high frequency clock signal CK1 is applied to a terminal CK of F1, and an output of F1 is applied to a terminal CK of F2, while a terminal D of F2 is always connected to high level, that is, logic level 1.

In the clock synchronizer 6, an integrator comprising a resistor R8 and a capacitor C4 is connected to a terminal $\overline{Q}$ of the D flip flop F2 and then also to a clear terminal $\overline{CLR}$ of F2 in the clock synchronizer 6, so that the D flip-flop F2 becomes clear according to a charge and discharge of the capacitor C4.

A latch 7 for receiving the data corresponding to the pulse width for control of a polarotator from a MICOM and providing it to a counter 8 latches the data K0-K7 coming from the MICOM (not shown in FIG. 3) in synchronization with a clock signal CK2.

A counter 8 for loading the data according to the output of the clock synchronizer 6 and counting it with a start value determined by the latch 7. Counter 8 is clocked according to the clock CK1 which is connected to the clock synchronizer 6 and the counter 8.

A counter disable part 9, for stopping the count until the next data are loaded when a carry over occurs, comprises biasing resistors R9 and R10 and a transistor Q3 connected through the resistors R9 and R10 to a terminal $\overline{RCO}$ of the counter 8.

The collector of Q3 is connected to enable a terminal $\overline{ENB}$ of the counter 8, so that the transistor Q3 controls the counter 8 to be enabled.

Figure 4:
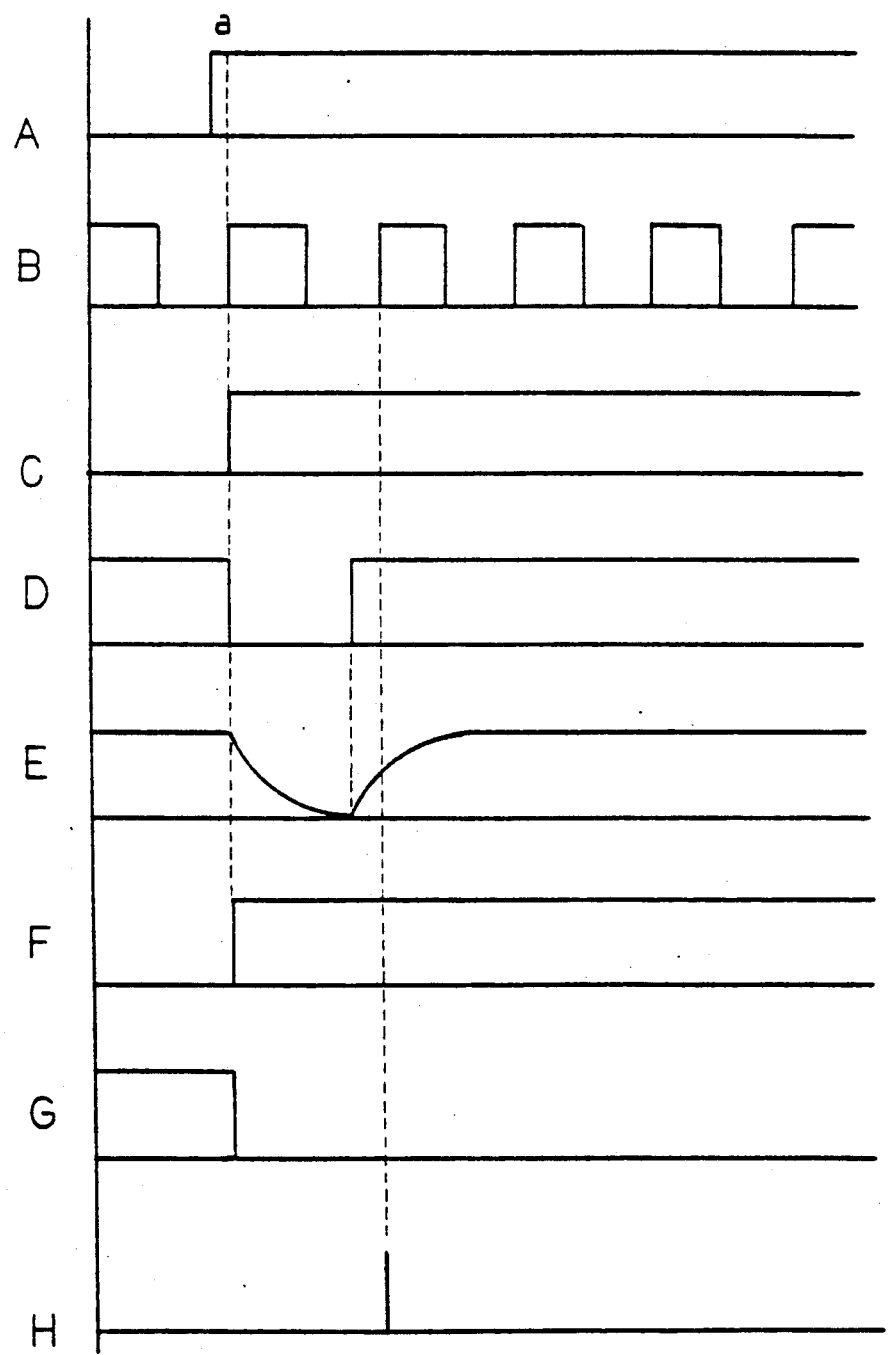
FIG. 4(A)-(H) is a waveform diagram of each part in the polarotator pulse generator circuit of FIG. 3 according to the present invention.

In the polarotator pulse generator circuit, when the VS power supply is applied to the sine-to-square converter 5, the VS power supply turns on the transistor Q2 through the protection diode D2, so that the square wave A as shown in FIG. 4 is applied to the clock synchronizer 6.

The reason for applying the square wave output of the sine-to-square converter 5 to the clock synchronizer 6 is that since the square wave and the clock CK1 are not synchronized with each other when the data are loaded to the counter 8 in accordance with the square wave output, it is required to prevent the time counting one clock CK1 from being varied at the loading instance.

Figure 5A:
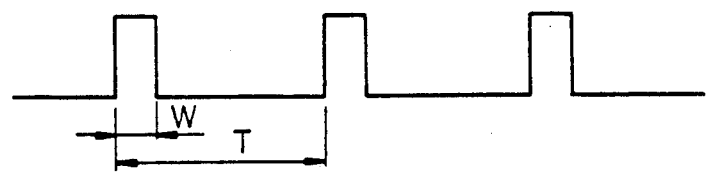
FIG. 5 is a pulse waveform diagram for explaining the present invention.
Figure 5B:
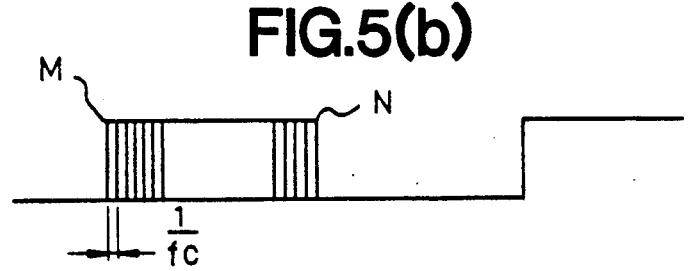
Figure 5C:
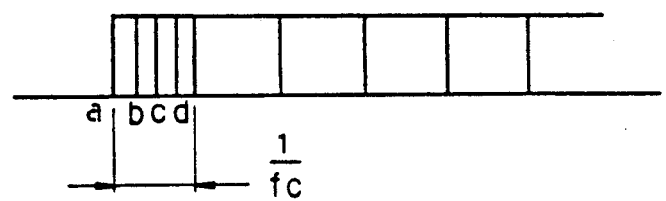

To explain this with reference to the extended waveform in FIG. 5(c), it follows.

If the clock CK1 and the square output are not synchronized at the instance of loading, the data may be loaded at the point a, or b,c,d . . . , as shown in FIG. 5(c), that is, the data can be loaded at any point during one clock interval of 1/fc, where fc represents the clock frequency. Thus, the polarotator pulse width counts the same value, although there is a time difference at the loading instance, and at this time the maximum time difference is 1/fc. That is, in order to solve such problem, the present invention employs the clock synchronizer 6.

The D flip-flop F1 receiving the pulse A as shown in FIG. 4 provides an output pulse C as shown in FIG. 4 in synchronization with the clock pulse B as shown in FIG. 4.

The D flip-flop F2 uses the output of F1 as a clock and a terminal D is always connected to high level, so that an output terminal $\overline{Q}$ of F2 provides the inverted output of F1, shown as pulse D in FIG. 4. Thus, the capacitor C4 connected to the terminal $\overline{Q}$ of F2 discharges the stored charge, which is already stored at the capacitor C4 when the output $\overline{Q}$ of F2 is high, through the resistor R8 with a RC time-constant R8×C4 as shown in pulse E of FIG. 4.

In other words, when the voltage across the capacitor C4 decreases and provides a low level to the clear terminal $\overline{CLR}$ of F2, the D flip-flop F2 becomes clear and the output terminal Q provides a low level signal. Then, the output terminal $\overline{Q}$ of F2 provides a high level signal, by which the capacitor C4 charges again through the resistor R8.

The counter 8 loads the data while the output $\overline{Q}$ of F2 falls to the low level, as shown in pulse F in FIG. 4, and the counter begins to count the clock from the next clock after loading the data as shown in (H). Therefore, although the square wave output of the sine-to-square converter 5 is not synchronized with the clock CK1, the data are loaded at the positive trigger of the clock CK1 and the counter 8 begins to count the clock after one clock pulse.

On the other hand, a start value of the counter is applied from the latch 7. That is, the latch 7 latches the data provided from the MICOM (not shown in figures) in synchronization with the clock CK2. At this time, the data K0–K7 provided from the MICOM determines a start value M. After counting from the start value M to the last value N, the counter provides a low level signal through the terminal $\overline{RCO}$.

The counter disable part 9 receiving the low level signal provides a high level signal to the enable terminal $\overline{ENB}$, since the transistor Q3 is turned off, so that the counter is disabled.

That is, assuming a 8-bit counter, the terminal $\overline{RCO}$ provides a high level signal until the last value 255 is counted. In other words, after loading the start value M from the latch 7, the terminal $\overline{RCO}$ of the counter 8 remains at the high level, but when the count reaches the last value 255, the terminal $\overline{RCO}$ provides the low level signal.

That is, as shown in FIG. 5(b), the terminal $\overline{RCO}$ remains at the high level state from the start value M to the last value N, but at the instance of becoming the last value N, here 255, the terminal $\overline{RCO}$ becomes low level. The time of the terminal $\overline{RCO}$ of the counter 8 remaining at the high level is equal to the time spent to count from M to 255, that is, N=255−M+1.

Accordingly, with an adjustment of the start value provided from the MICOM, the counter 8 can control a count time, so that the terminal $\overline{RCO}$ of the counter 8 remains at the high level. Under the condition that the last value N is determined, the counter 8 controls the time interval of the high level at the terminal $\overline{RCO}$ by adjusting the start value M, as shown in FIG. 5(b). Ultimately, the polarotator is controlled by using the high level signal of the terminal $\overline{RCO}$ of the counter 8.

As mentioned above, the present invention controls linearly the probe of the antenna and rotates it with a constant speed from first to last, by driving the polarotator for the controlled count time according to the data value provided from the MICOM.

The invention is in no way limited to the embodiment described hereinabove. Various modifications of disclosed embodiment as well as other embodiments of the invention will become apparent to persons skilled in the art upon reference to the description of the invention.

It is therefore contemplated that the appended claims will cover any such modifications of embodiments as fall within the true scope of the invention.

What is claimed is:

1. A polarotator control signal generator circuit for a satellite broadcasting receiver, comprising:
   a sine-to-square converter for converting a sine wave of an AC power supply to a square wave;
   a clock synchronizer for synchronizing the square wave of said sine-to-square converter with a high frequency clock signal and providing a loading instance control signal;
   a latch for receiving data representative of a desired pulse width and for providing said data to a counter in response to a first clock signal;
   said counter for counting said high frequency clock signal from a start value determined by the data provided from said latch and loaded in said counter in response to said loading instance control signal and for generating polarotator control signals until said counter reaches a predetermined final count; and
   a counter disable means for stopping the count, until a next loading instance control signal is received by said counter, when said counter reaches said predetermined final count.

2. The polarotator control signal generator circuit according to claim 1, wherein said sine-to-square converter comprises a diode for protecting the circuit from a reverse voltage of an AC power supply and a transistor being driven by the output of said diode.

3. The polarotator control signal generator circuit according to claim 1, wherein said clock synchronizer comprises a first D flip-flop, of which an input terminal is connected to said sine-to-square converter, and a second D flip-flop, of which an input terminal is connected to a constant high level and a clock terminal is connected to an output terminal of said first D flip-flop, and a resistor and a capacitor for charging and discharging the output signal of said second D flip-flop and providing the charge and discharge voltage to a clear terminal of said second D flip-flop.

4. The polarotator control signal generator circuit according to claim 1, wherein said counter disable means comprises a transistor for controlling said counter, being driven by the output of said counter.

5. The polarotator control signal generator circuit comprising:
   means for providing a square wave signal from a power supply sine wave,
   a clock synchronizer for synchronizing said square wave signal with a high frequency clock signal for generating a loading control signal,
   a latch for receiving data representative of a desired pulse width for control of the polarotator and for providing a start count number, based on said data;
   a counter for counting said high frequency clock signals from said start count number to a predetermined final count number and for providing polarotator control signals during said counting,
   a counter disable means for termporarily preventing further counting after said final count number is reached.

6. The polarotator control signal generator circuit according to claim 5, wherein said counter further includes means for receiving said loading control signal for causing said counter to load said start count number.

7. The polarotator control signal generator circuit according to claim 6, wherein receipt of a next loading control signal by said counter re-enables counting from a next start count number after said next start count number has been loaded in accordance with receipt of said next loading control signal.

8. The polarotator contol signal generator circuit according to claim 5, wherein said counter begins said counting one clock pulse of said high frequency clock signal after said start count number has been loaded.

9. The polarotator control signal generator circuit according to claim 5, wherein said counter is re-enabled, to begin a next counting, one clock pulse of said high frequency clock signal after a next start count number has been loaded.

10. A method for controlling adjustment of an angle of a probe of a polarotator of a satellite broadcast receiver comprising the steps of;
   converting a sine wave signal into a square wave signal;
   synchronizing said square wave signal with a high frequency clock signal for generating a load control signal;
   latching a data signal representative of a desired pulse width;
   loading said latched data signal into said counter as a start value in response to said load control signal;
   counting said high frequency clock signal from said start value to a predetermined value in response to said loading step;
   adjusting said angle of said probe during said counting step; and
   terminating said counting step after counting to said predetermined value.

11. The method for controlling adjustment of a polarotator of a satellite broadcast receiver as claimed in claim 10, including the step of:
   enabling said counter to begin a new counting step any time a start value is loaded in response to said load control signal.

12. The method for controlling adjustment of a polorotator of a satellite broadcast receiver as claimed in claim 10, including the step of:
   enabling said counter to begin said counter step a predetermined time after said start value is loaded in response to said load control signal.

13. A circuit for controlling adjustment of a polarotator of a satellite broadcast receiver comprising:
   means for receiving a power supply sine wave and for converting said sine wave to a square wave;
   a first flip-flop for receiving said square wave at an input terminal thereof and for receiving a first clock signal at a clock terminal thereof;
   a second flip-flop for receiving an output from said first flip-flop at a clock terminal thereof, and for receiving a logic "high" signal at an input terminal thereof;
   an integrating means for receiving an output of said second flip-flop and for providing a clear control pulse to said second flip-flop in response to said output of said second flip-flop;
   a latch for latching data indicative of a pulse width representative of a desired adjustment of said polarotator and for outputting said data as a start count value in response to a second clock signal;
   a counter for loading said start count value from said latch in response to said output of said second flip flop and for counting pulses of said first clock signal from said start count value to a predetermined final count value in response to said loading of said start count value;
   wherein said counter generates a polarotator control signal during said counting until said predetermined final count value is reached; and
   disabling means for disabling said counter from counting until said counter loads a next start count value in response to a next output signal from said second flip-flop, said disabling means being responsive to said counter reaching said predetermined final count value.

14. The circuit for controlling adjustment of a polarotator of a satellite broadcast receiver as set forth in claim 13, wherein said fist flip-flop, said second flip-flop and said integrating means comprise a clock synchronizing circuit for synchronizing said first clock signal to said power supply sine wave.

* * * * *

UNITED STATES PATENT AND TRADEMARK OFFICE
CERTIFICATE OF CORRECTION

PATENT NO. : 5,113,086

DATED : 12 May 1992

INVENTOR(S) : Seong-Jae CHO

It is certified that error appears in the above-identified patent and that said Letters Patent is hereby corrected as shown below:

IN THE CLAIMS

Claim 12, Column 8, Line 4, change "counter" to --counting--

Claim 14, Column 8, Line 43, change "fist" to --first--.

Signed and Sealed this

Third Day of August, 1993

Attest:

MICHAEL K. KIRK

*Attesting Officer*     *Acting Commissioner of Patents and Trademarks*